(12) United States Patent
Katai et al.

(10) Patent No.: US 10,775,982 B2
(45) Date of Patent: Sep. 15, 2020

(54) METHODS AND SYSTEMS FOR MANAGING MULTIPLE MODES OF COMMUNICATION WITHIN A SINGLE ON-SCREEN USER INTERFACE

(71) Applicant: Verizon Patent and Licensing Inc., Arlington, VA (US)

(72) Inventors: Lonnie Katai, Murphy, TX (US); Kristopher T. Frazier, McKinney, TX (US); Michael J. D'Argenio, Green Brook, NJ (US); Zachariah Eamon Nelson, Elizabeth, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 554 days.

(21) Appl. No.: 14/980,480

(22) Filed: Dec. 28, 2015

(65) Prior Publication Data

US 2017/0185267 A1 Jun. 29, 2017

(51) Int. Cl.
| | | |
|---|---|---|
| *G06F 3/0484* | (2013.01) | |
| *G06F 3/0488* | (2013.01) | |
| *H04M 1/725* | (2006.01) | |
| *G06F 3/0482* | (2013.01) | |
| *H04L 12/58* | (2006.01) | |
| *H04L 12/24* | (2006.01) | |

(52) U.S. Cl.
CPC ........ *G06F 3/04845* (2013.01); *G06F 3/0482* (2013.01); *G06F 3/04842* (2013.01); *G06F 3/04883* (2013.01); *G06F 3/04886* (2013.01); *H04L 41/22* (2013.01); *H04L 51/066* (2013.01); *H04L 51/16* (2013.01); *H04M 1/72583* (2013.01)

(58) Field of Classification Search
CPC .............. G06F 3/04845; G06F 3/0482; G06F 3/04842; G06F 3/04883; G06F 3/04886; H04L 41/22; H04L 51/066; H04L 51/16; H04M 1/72583
USPC ........................................................ 715/753
See application file for complete search history.

(56) References Cited

U.S. PATENT DOCUMENTS

| | | | | |
|---|---|---|---|---|
| 2011/0003585 A1* | 1/2011 | Wang | ................ | H04M 1/72583 455/418 |
| 2011/0035687 A1* | 2/2011 | Katis | ................... | H04L 12/1827 715/758 |

(Continued)

*Primary Examiner* — Tadesse Hailu
*Assistant Examiner* — Darrin Hope

(57) ABSTRACT

An exemplary multimode communication system presents a single on-screen user interface on a communication device associated with a user. The user interface includes a contact communication pane that displays a communication history between the user and a selected contact, and a communication initiation pane that displays a first user input panel configured to allow the user to initiate a communication session of a first communication mode with the selected contact. While the communication history is displayed in the contact communication pane, the multimode communication system detects a user action with respect to the communication initiation pane and, in response, graphically replaces the first user input panel with a second user input panel configured to allow the user to initiate a communication session of a second communication mode with the selected contact. Corresponding systems and methods are also described.

20 Claims, 11 Drawing Sheets

(56) References Cited

U.S. PATENT DOCUMENTS

| | | | | |
|---|---|---|---|---|
| 2012/0114108 | A1* | 5/2012 | Katis | H04W 4/12 379/88.13 |
| 2014/0149919 | A1* | 5/2014 | Larson | G06F 3/0482 715/783 |
| 2015/0038121 | A1* | 2/2015 | Koum | H04L 51/10 455/412.2 |
| 2015/0340037 | A1* | 11/2015 | Kim | G10L 15/26 704/235 |
| 2016/0364127 | A1* | 12/2016 | Naegelkraemer | H04M 1/72522 |

* cited by examiner

METHODS AND SYSTEMS FOR MANAGING MULTIPLE MODES OF COMMUNICATION WITHIN A SINGLE ON-SCREEN USER INTERFACE

BACKGROUND INFORMATION

In recent years, electronics and communication technology advancements have combined to offer business and consumer users an unprecedented choice of communication capabilities and features. For example, a communication service provider may offer users an ability to perform different modes of communication (e.g., voice and/or video calls, text and/or multimedia messaging exchanges, etc.) using just one communication device. Unfortunately, each communication mode may be associated with a disparate user interface (e.g., a user interface within a phone application, a user interface within a messaging application, etc.). As a result, initiating communication sessions of multiple communication modes may seem disjointed, difficult, inconvenient, and/or inefficient to users, thus making them less likely to use the multimode communication capabilities offered by the communication service provider.

In particular, converting a communication session of one communication mode (e.g., a messaging exchange) into a communication session of another communication mode (e.g., a phone call) may require that a user perform various user actions to close out of a first user interface associated with the communication session of the one communication mode and open up another user interface associated with the communication session of the other communication mode. Because the multiplicity of user actions on the disparate user interfaces may be confusing, cumbersome, unintuitive, or simply "not worth the trouble," users may be discouraged from switching between communications sessions of different communication modes even when a different mode of communication may better suit a particular communication session.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
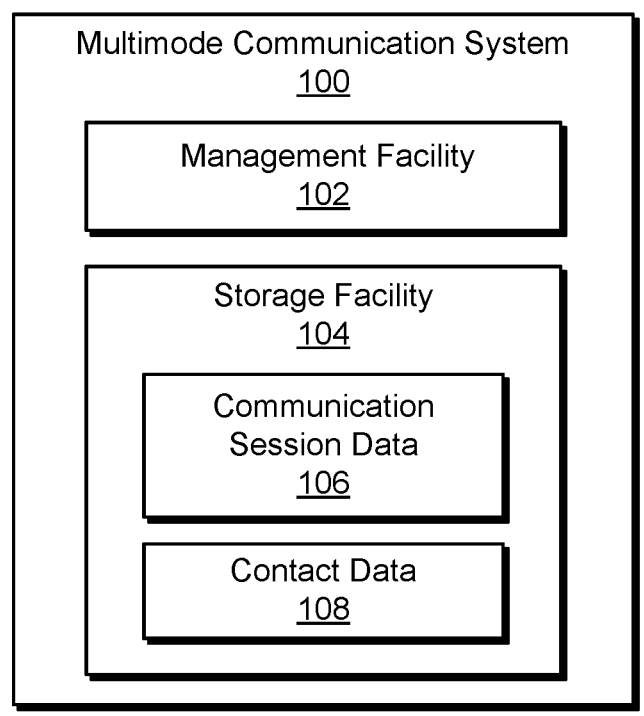
FIG. 1 illustrates an exemplary multimode communication system configured to manage communication sessions of different communication modes conducted on a communication device according to principles described herein.

Methods and systems for managing multiple modes of communication within a single on-screen user interface are described herein. As will be illustrated below, the single on-screen user interface may be presented by a communication device (e.g., a mobile phone or tablet computer). The communication device may be configured to engage in communication sessions of various communication modes with one or more other communication devices. For example, the communication device may be configured to engage with other communication devices in communication sessions including phone calls (e.g., voice calls, video calls, group calls, etc.), messaging exchanges (e.g., text messaging exchanges, multimedia messaging exchanges, group messaging exchanges, file transfers, etc.), and/or other communication sessions of other communication modes.

In some embodiments, the on-screen user interface may concurrently include a contact communication pane that displays a communication history between the user and a selected contact (e.g., a messaging exchange between the user and a user of another communication device), and a communication initiation pane that displays a first user input panel configured to allow the user to initiate a communication session of a first communication mode with the selected contact while the communication history is displayed within the contact communication pane. The multimode communication system may detect a user action performed by the user with respect to the communication initiation pane while the communication history is displayed within the contact communication pane. In response to the user action, the multimode communication system may graphically replace the first user input panel with a second user input panel within the communication initiation pane. The second user input panel may be configured to allow the user to initiate a communication session of a second communication mode with the selected contact while the communication history continues to be displayed in the contact communication pane.

Users are able to most fully take advantage of communication services, such as the ability to communicate via different communication modes using the same communication device, when the services are managed with intuitive and logical user interfaces. By presenting a single on-screen user interface (e.g., a single on-screen user interface provided by a single application executed by the communication device) to manage multiple modes of communication, the methods and systems described herein may allow users to take advantage of features involving communication sessions of differing communication modes.

For example, as will be described in more detail below, the user of the communication device may be able to initiate and/or switch between communication sessions of different communication modes (e.g., phone calls, messaging exchanges, etc.) with one or more selected contacts (e.g., users of other communication devices) while continuously viewing a communication history between the user and the selected contact or contacts (e.g., a messaging exchange history with the contact, a phone call history with the contact, a hybrid communication history with the contact including both messaging exchange and phone call history information, etc.) all from a single on-screen user interface. Thus, for example, a user engaged in a messaging exchange with a selected contact may initiate a phone call with the contact or with another contact without switching to a different user interface and while still viewing the communication history of the messaging exchange with the contact. Similarly, a user engaged in a phone call with a selected contact may initiate a messaging exchange with the selected contact or with another contact without leaving the user interface used to initiate or accept the phone call. The disclosed methods and systems may also provide various other benefits that will be made apparent herein.

FIG. 1 illustrates an exemplary multimode communication system 100 ("system 100") configured to manage communication sessions of different communication modes conducted on a communication device. As shown, system 100 may include, without limitation, a management facility 102 and a storage facility 104 selectively and communicatively coupled to one another. It will be recognized that although facilities 102 and 104 are shown to be separate facilities in FIG. 1, any of the facilities 102 and 104 may be combined into fewer facilities, such as into a single facility, or divided into more facilities as may serve a particular implementation.

Storage facility 104 may maintain communication session data 106 and contact data 108 generated and/or used by management facility 102. For example, as will be described below, communication session data 106 may include data related to communication sessions. More specifically, communication session data 106 may include, but is not limited to, data related to a communication mode used for a communication session, historical data for a communication session (e.g., messages that have been exchanged), data related to a communication device and/or person with which a communication session is associated (e.g., a contact name, a phone number of the other communication device, etc.), data related to the timing of a communication session (e.g., a timestamp corresponding to when the communication session was initiated, a timestamp corresponding to when the communication session was terminated, a duration of the communication session, etc.), data associated with an on-screen user interface presented by a communication device, data representative of detected users actions with respect to the on-screen user interface, etc.

Similarly, contact data 108 may include data related to contacts (e.g., people known by one or more users of a communication device). More specifically, contact data 108 may include, but is not limited to, information associated with contacts of the user such as one or more phone numbers, street addresses, email addresses, fax numbers, webpage URLs, birthdates, other relevant dates (e.g., anniversaries, etc.), related names, social networking profiles, instant messages, etc. Storage facility 104 may maintain additional or alternative data as may serve a particular implementation. For example, storage facility 104 may store data associated with the communication device such as files downloaded to the communication device or multimedia files associated with the communication device (e.g., pictures, videos, voice recordings, etc., captured using the communication device).

Management facility 102 may perform one or more communication session management operations for communication sessions with different communication modes. For example, management facility 102 may facilitate presenting a single on-screen user interface on a communication device that includes a contact communication pane and a communication initiation pane within the single on-screen user interface. Management facility 102 may present information and/or user input components related to one or more contacts of the user within the contact communication pane. For example, management facility 102 may present a plurality of selectable items representative of one or more contacts of the user (e.g., including pictures, names, and/or other information by which the contacts may be identified). As another example, when a particular contact is selected (e.g., from the plurality of selectable items representative of the one or more contacts), management facility 102 may display a communication history between the user and the selected contact within the contact communication pane. Detailed examples of contact communication panes presented by management facility 102 will be described below.

Management facility 102 may also present information and/or user input components for initiating communications sessions with selected contacts or other users within the communication initiation pane. For example, management facility 102 may present a user input panel (e.g., with a numeric dialing keypad, an alphabetic typing keypad, etc.) to allow the user to initiate communication sessions of a desired communication mode with one or more selected contacts selected in the contact communication pane or with other users of other communication devices. Management facility 102 may also present a graphical user input component, such as a slider switch, to allow the user to select a desired communication mode for communication sessions to be initiated (e.g., phone calls, messaging exchanges, etc.).

Management facility 102 may detect a user action performed by the user with respect to the communication initiation pane. For example, in embodiments where the user interface is presented on a point-and-click user interface (e.g., on a traditional desktop or notebook computer), management facility 102 may detect a user action such as that the user slides (e.g., by clicking or dragging and dropping with a pointing tool such as a mouse or trackpad) the slider switch to change from phone calls to messaging exchanges as the desired communication mode for communication sessions to be initiated. Similarly, in certain embodiments, the on-screen user interface may be a touchscreen interface (e.g., on a smartphone device, tablet device, personal computer with a touchscreen, etc.) and the user action performed by the user may be a user touch gesture performed with respect to a position within the touchscreen interface at which the input component (e.g., slider switch) is presented.

Accordingly, in various examples, the user may perform a tap gesture, a double tap gesture, a pinch gesture, a press gesture, a spread gesture, a flick gesture, a drag-and-drop gesture, a swipe gesture, a rotate gesture, another touch gesture, or other suitable user gesture for a non-touchscreen user interface, with respect to the input component presented within the touchscreen interface or other on-screen user interface. Exemplary manners in which management facility 102 may detect the user action will be described below.

In response to detecting the user action, management facility 102 may graphically replace one user input panel (e.g., a user input panel including a numeric dialing keypad) with a different user input panel (e.g., a user input panel including an alphabetic typing keypad) to allow the user to initiate communication sessions of the communication mode indicated by the user action (e.g., indicated by a selected position of an input component such as the slider switch discussed above). Management facility 102 may perform the replacement of the user input panel within the communication initiation pane while the contact communication pane continues to display a contact list or a communication history and is not substantially affected by the replacement. Detailed examples of communication initiation panes presented by management facility 102 will be described below.

Figure 2:
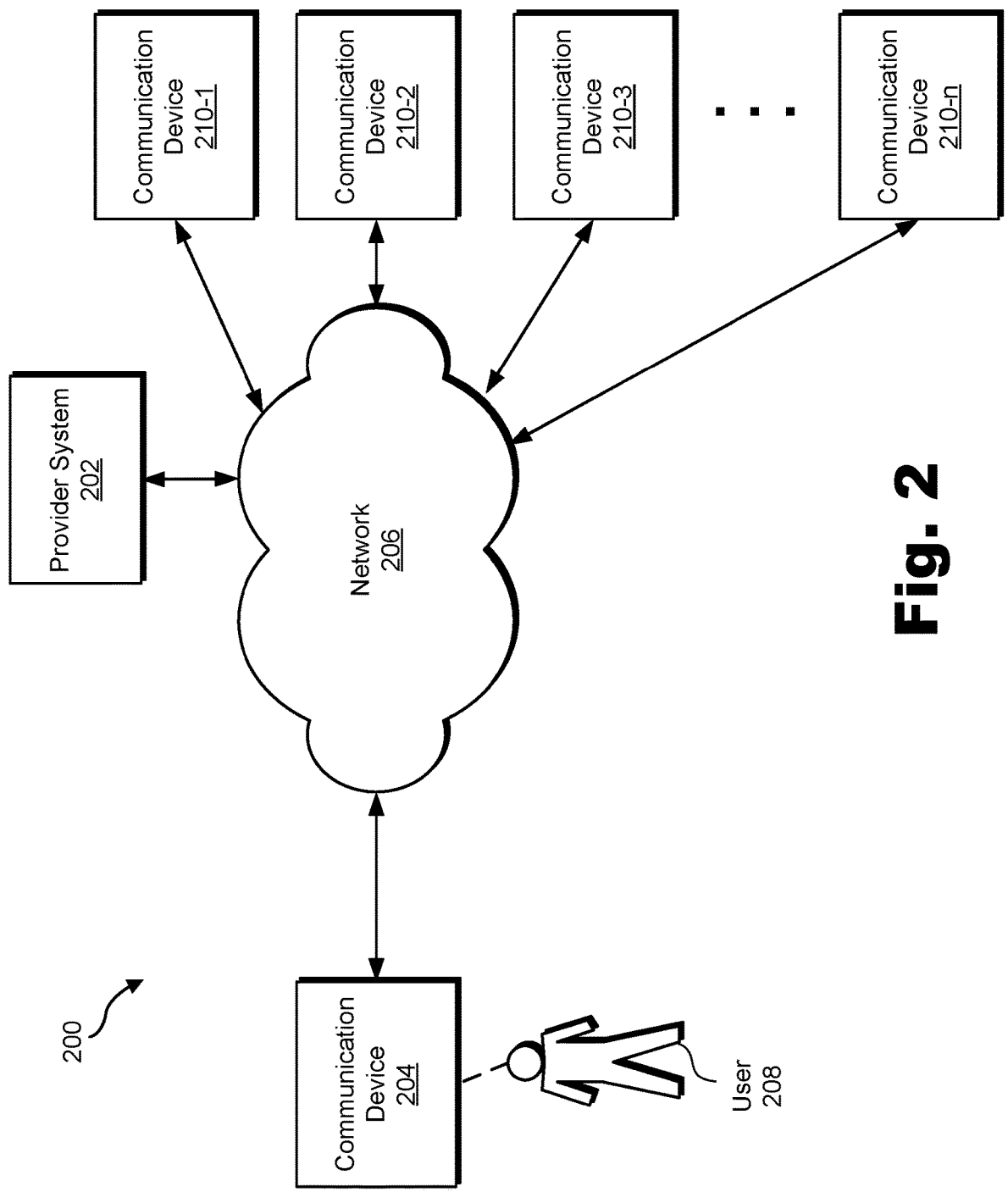
FIG. 2 illustrates an exemplary configuration that implements an exemplary multimode communication system according to principles described herein.

FIG. 2 illustrates an exemplary configuration 200 that implements system 100. As shown, configuration 200 may include a provider system 202, a communication device 204 (e.g., a smartphone, a tablet device, etc.), and one or more additional communication devices 210 (e.g., communication devices 210-1 to 210-n) all communicatively coupled through a network 206. As illustrated, communication device 204 may be associated with a user 208. It is noted that communication devices 210 may also be associated with respective users (not shown). For example, each of the communication devices 210 may be associated with a contact stored on communication device 204 (e.g., a person known by user 208). Each of these elements will now be described in detail.

Communication device 204 may be configured to facilitate one or more communication sessions that user 208 wishes to conduct using communication device 204. To this end, as will be described below, communication device 204 may engage in communication sessions of different communication modes with one or more of communication devices 210 by way of network 206. Communication device 204 and communication devices 210 may each include or be implemented by any suitable communication device such as a mobile or wireless device (e.g., a smartphone and/or a tablet device), a telephone or telephonic system, a personal computer, a set-top box device, a personal digital assistant device, a gaming device, a television device, and/or any other suitable communication device configured to engage in communication sessions (e.g., voice calls, video calls, group calls, text messaging exchanges, multimedia messaging exchanges, group messaging exchanges, etc.) with other communication devices. A communication device that implements the teachings described herein (e.g., communication device 204) may engage in communication sessions with other communication devices (e.g., communication devices 210) whether or not the other communication devices implement the teachings described herein.

Provider system 202 may be associated with (e.g., provided and/or managed by) a communication service provider (e.g., a network service provider, an application service provider, etc.) and may be configured to provide one or more communication services (e.g., voice, video, and messaging communication services, etc.) to communication device 204 and/or to communication devices 210. For example, provider system 202 may manage (e.g., connect, disconnect, track, allow, disallow, etc.) communication sessions between communication devices, such as between communication device 204 and communication devices 210. To this end, in certain embodiments provider system 202 may direct or facilitate one or more communication devices in presenting on-screen user interfaces representative of communication sessions in which the communication devices are engaged. For example, provider system 202 may provide an application that may be executed by communication device 204 and that may direct communication device 204 to present a user interface and/or perform any of the multimode communication management operations described herein.

In other embodiments, communication devices (e.g., communication device 204 and/or one or more of communication devices 210) may manage their own respective communication sessions and/or on-screen user interfaces with little or no direction from provider system 202. For example, communication device 204 may be configured to manage the communication sessions in which it is engaged and/or to present the user interface independently to allow user 208 to initiate and engage in communication sessions.

Accordingly, in some examples, system 100 is entirely implemented by communication device 204 while in other examples system 100 may be entirely implemented by provider system 202. In yet other examples, system 100 may be implemented by a combination of communication device 204 and provider system 202.

In some examples, provider system 202 may manage (e.g., track, allow, disallow, route, etc.) network traffic (i.e., data) that flows through network 206. To this end, provider system 202 may be implemented by one or more gateways, routers, servers (e.g., domain name system ("DNS") servers and/or billing management servers), and/or other network components as may serve a particular implementation.

Communication device 204, provider system 202, and communication devices 210 may communicate with one another using any suitable communication technologies, devices, media, and protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, communication device 204, provider system 202, and communication devices 210 may communicate by way of network 206. Network 206 may include any provider-specific network (e.g., a wireless carrier network or a mobile telephone network), the Internet, or any other suitable network. Data may flow between communication device 204, provider system 202, and communication devices 210 using any suitable communication technologies, devices, media, and protocols as may serve a particular implementation.

While only one network 206 is shown in FIG. 2, it will be recognized that communication device 204 may communicate with provider system 202 and/or communication devices 210 by way of multiple interconnected networks in accordance with the methods and systems described herein as may serve a particular implementation.

System 100 (e.g., as implemented in configuration 200) may facilitate the management of communication sessions of different communication modes in various ways. As such, exemplary manners by which system 100 may allow a user (e.g., user 208) to manage communication sessions of different communication modes from a single on-screen user interface presented on a communication device (e.g., communication device 204) will now be described.

Figure 3:
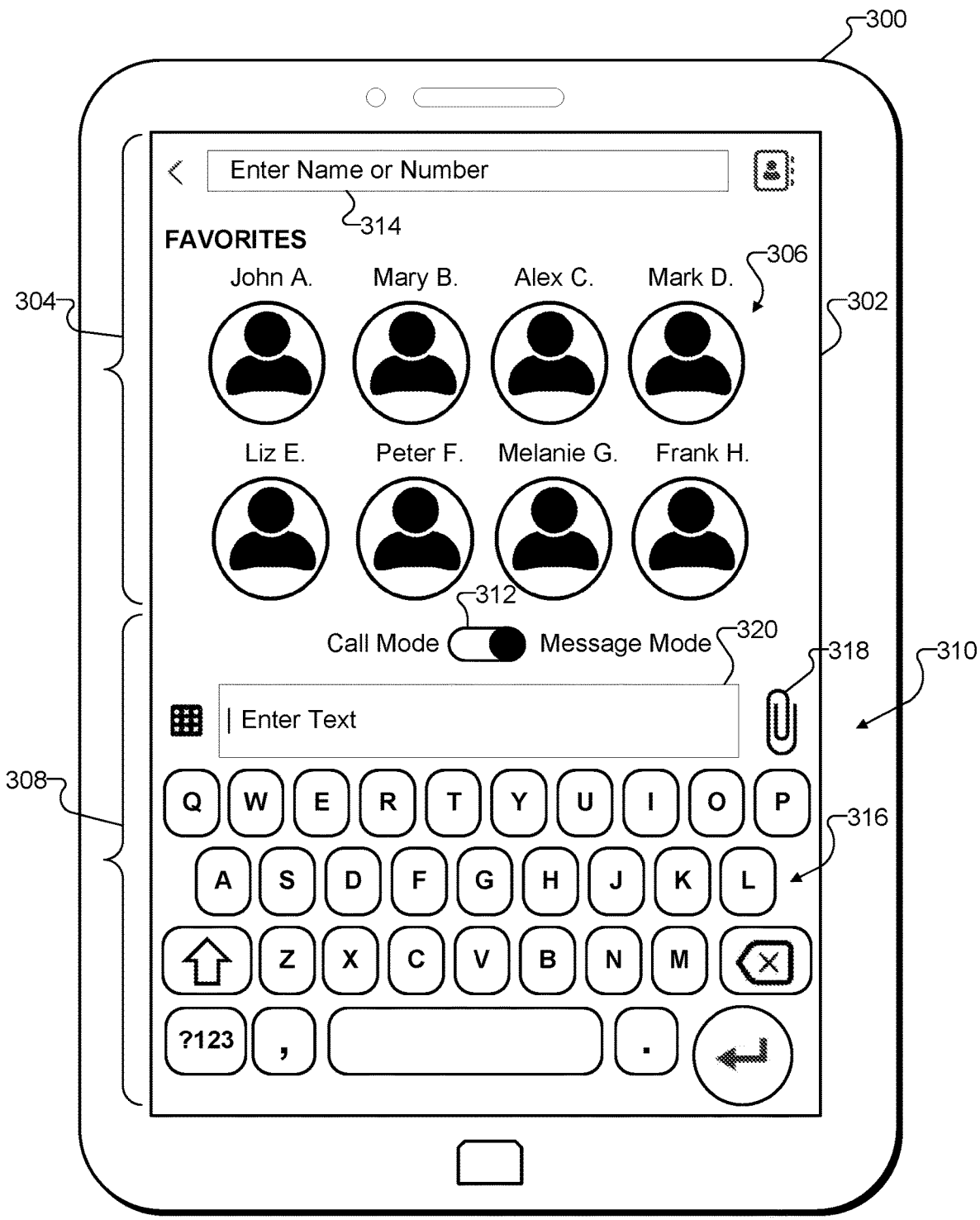
FIGS. 3-8 show an exemplary communication device on which an exemplary on-screen user interface is presented according to principles described herein.

FIG. 3 shows an exemplary communication device 300 on which an exemplary on-screen user interface 302 is presented. User interface 302 may be configured to allow a user of communication device 300 to initiate one or more communication sessions with one or more selected contacts and/or with other users of other communication devices (e.g., users of communication devices 210 of FIG. 2). Moreover, user interface 302 may allow the user to accept and engage in communication sessions initiated by other communication devices, as well as to manage one or more communication sessions in which communication device 300 is engaged. To this end, user interface 302 may include a contact communication pane 304 including a plurality of selectable items 306 each representative of a contact of the user. User interface 302 may further include a communication initiation pane 308 having a user input panel 310 configured to allow the user to initiate a communication session of a particular communication mode and a graphical user input component 312 to allow the user to select the particular communication mode of the communication session to be initiated.

As shown, the plurality of selectable items 306 within contact communication pane 304 may each represent a contact of the user. As such, each selectable item 306 may include a picture of the contact it represents or an icon that is associated with the contact. Additionally, each selectable item 306 may be labeled with a full or abbreviated name of the contact it represents (e.g., John A., Mary B., Alex C., Mark D., Liz E., Peter F., Melanie G., and Frank H.).

User interface 302 may be configured to allow users to browse, search, filter, and otherwise display and select contacts in any suitable way. For example, standard user touch gestures and user interface features may be employed to browse additional selectable items 306 representative of additional contacts within contact communication pane 304. For example, the user may perform a user touch gesture (e.g., swiping up and/or down) with respect to contact communication pane 304 to scroll through additional selectable items 306 representing additional contacts associated with communication device 300 (e.g., contacts stored in contact data 108 of storage facility 104, described above in relation to FIG. 1). Additionally, contacts may be filtered and/or searched for by name, number, or other identifying information associated with the contacts. For example, contact selection field 314 may allow a user to input a full or partial name of a contact, a full or partial phone number of a contact, and/or other identifying information associated with one or more contacts to filter and/or search through contacts associated with communication device 300. Additionally, other user interface features that facilitate filtering, searching, and/or selecting contacts may also be included within contact communication pane as may serve a particular implementation.

In some examples, system 100 may detect that the user selects (e.g., touches, taps, etc.) a first selectable item from the plurality of selectable items 306 presented within user interface 302 and may determine that the first selectable item 306 is representative of a selected contact. For example, system 100 may detect that the user touches the selectable item 306 associated with a contact named "Liz E." and determine that Liz E. is a first selected contact. In response to detecting the selection of the first selectable item 306 and determining the first selected contact, system 100 may display within contact communication pane 304 a communication history between the user and the first selected contact (e.g., a messaging exchange history between the user and Liz E.). Examples of communication histories will be described in more detail below.

In the same or other examples, system 100 may additionally detect that the user selects a second selectable item 306 and may determine that the second item is representative of a second selected contact (e.g., a contact named "Peter F."). In response to detecting the selection of the first and second selectable items 306 and determining the first and second selected contacts, system 100 may display within contact communication pane 304 a communication history between the user and the first and second selected contacts (e.g., a group messaging exchange history between the user, Liz E., and Peter F.). Examples of communication histories will be described in more detail below.

Additionally, with the first and second selected contacts designated by the user, system 100 may facilitate initiating a group communication session with the selected contacts. For example, system 100 may configure one or more elements within communication initiation pane 308 (e.g., user input panel 310, etc.) to allow the user to initiate a group communication session of the communication mode indicated by graphical user input component 312 with both the first and the second selected contacts. Examples of using elements within communication initiation pane 308 to initiate communication sessions will be described in more detail below.

As shown in FIG. 3, communication initiation pane 308 within user interface 302 may include user input panel 310 for initiating a communication session and input component 312 for selecting the communication mode of the communication session. For example, as shown, input component 312 may be a slider switch configured to select between a "Call Mode" and a "Message Mode." When input component 312 is set to "Call Mode," user input panel 310 may be configured to facilitate the initiation of a phone call (e.g., a voice call, a video call, a group call, etc.). Conversely, when input component 312 is set to "Message Mode," user input panel 310 may be replaced with a user input panel configured to facilitate the initiation of a messaging exchange (e.g., a text messaging exchange, a multimedia messaging exchange, a group messaging exchange, etc.).

As illustrated, the presence of input component 312 allows a user to explicitly see what communication mode communication initiation pane 308 is in (e.g., "Call Mode" or "Message Mode") and to perform a user action such as a manipulation of input component 312 (e.g., to toggle the slider switch) to change communication initiation pane 308 to the other communication mode. However, in certain embodiments, communication initiation pane 308 may not present a graphical user input component such as input component 312 but, rather, may be configurable by one or more user gestures with respect to communication initiation pane 308. For example, rather than toggling a slider switch, a user gesture, such as a sideways swipe gesture, may be performed to indicate a desired change of communication mode within communication initiation pane 308. In certain examples, a sideways swipe in a particular direction (e.g., a left swipe or a right swipe) may be associated with a particular communication mode. Thus, a user may perform a sideways swipe gesture in a first direction (e.g., to the left) to indicate that a phone call communication session will be initiated, while the user may perform a sideways swipe gesture in a second direction (e.g., to the right) to indicate that a messaging exchange communication session will be initiated. Examples of communication initiation pane 308 in both "Call Mode" and in "Message Mode" will be described and illustrated herein.

For example, in FIG. 3, input component 312 is set to "Message Mode." Thus, communication initiation pane 308 may present user input panel 310 including an alphabetic typing keypad 316, an attachment selection icon 318, and a message editing stage 320 to allow the user to initiate a messaging exchange communication session, as shown. Alphabetic typing keypad 316 of user input panel 310 may be a QWERTY keyboard to allow a user to input text (e.g., to type a text message). In certain examples, alphabetic typing keypad 316 may include another type of keyboard or other text entry tool (e.g., a Dvorak keyboard, a 10-key numeric keypad, a selection of pre-typed words or messages, etc.). Additionally, alphabetic typing keypad 316 may be temporarily modified to allow input of characters not available to the user from the standard key layout of alphabetic typing keypad 316 using the same keys that allow input of alphabetic characters. For example, alphabetic typing keypad 316 may be temporarily modified to allow input of non-alphabetic characters such as numbers and punctuation marks, or foreign characters needed to type words in foreign languages. Accordingly, alphabetic typing keypad 316 may facilitate the user in inputting any text the user desires.

As shown, user input panel 310 may additionally include attachment selection icon 318, which, when selected (e.g., tapped or touched), may present options to allow the user to select an attachment (e.g., a document file or other file, a location indicator, multimedia content such as a picture, a voice recording, a sound clip, a video clip, etc.) to send in the messaging exchange. For example, when selected, attachment selection icon 318 may present an option (not shown) for the user to take a new photo, select a photo or other file stored on communication device 300 (e.g., within storage facility 104, described in relation to FIG. 1), to record a voice recording, to record a current location of the communication device, etc. User input panel 310 may send whatever data the user selects using attachment selection icon 318 in a messaging exchange (e.g., a multimedia messaging exchange) and/or may attach the data to a text message input using alphabetic typing keypad 316 such that the user can initiate a messaging exchange including both text and attachment data selected using attachment selection icon 318.

To further facilitate the initiation of a messaging exchange, user input panel 310 may also include message editing stage 320 where text and/or attachment data (e.g., files or multimedia content selected using attachment selection icon 318) may be input, edited, prepared, and/or otherwise staged prior to sending them in a messaging exchange communication session. Examples of staging messages using message editing stage 320 will be described in more detail below.

Figure 4:
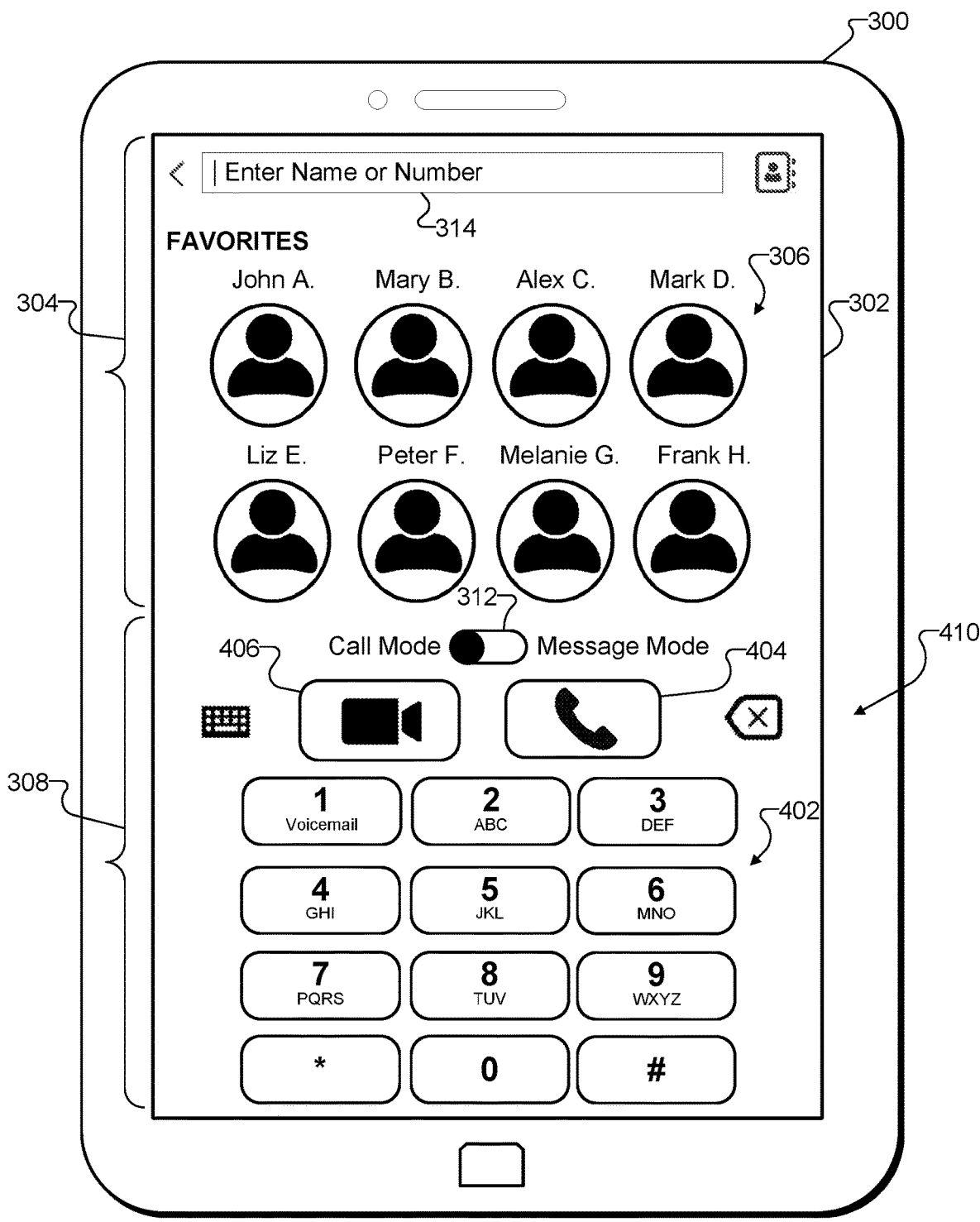

FIG. 4 shows exemplary communication device 300 on which exemplary on-screen user interface 302 is presented. Within user interface 302, FIG. 4 shows several of the elements described above with respect to FIG. 3. For example, FIG. 4 shows contact communication pane 304 with selectable items 306 representative of contacts associated with communication device 300, and contact selection field 314 to facilitate the user in searching and selecting a desired contact. FIG. 4 also includes communication initiation pane 308 with a user input panel (e.g., user input panel 410) for allowing the user to initiate a communication session and graphical user input component 312 for allowing the user to select the communication mode of the communication session.

In contrast to FIG. 3, FIG. 4 shows that input component 312 is set to "Call Mode," rather than "Message Mode." Accordingly, as shown, user input panel 410 has graphically replaced user input panel 310 within user interface 302. As shown, because input component 312 is set to "Call Mode," user input panel 410 may include a call initiation panel 402, a voice call initiation button 404, and a video call initiation button 406 configured to allow the user to initiate a phone call.

Call initiation panel 402 may include user input components that facilitate initiation of a phone call communication session. For example, as shown in FIG. 4, call initiation panel 402 may include a numeric dialing keypad to allow the user to dial a phone number of a selected contact. The numeric dialing keypad may include standard features such as ten digits (0-9) and star (*) and pound (#) characters used for touchtone navigation on certain phone systems with which the user may engage in communication sessions. In some examples, a dedicated dialing stage (not explicitly shown) may be included to allow a user to input, edit, prepare, and/or otherwise stage a phone number using the numeric dialing keypad or another method (e.g., pasting the phone number from a virtual clipboard). Alternatively, as shown in FIG. 4, contact selection field 314 may be used as a dialing stage within which the user may dial and/or otherwise stage the phone number before initiating a phone call with the phone number.

In some examples, call initiation panel 402 may include a selectable contact information item representative of a phone number of a selected contact to allow the user to directly input and/or initiate the phone call with the selected contact without dialing the phone number. For example, one or more phone numbers associated with a contact selected from selectable items 306 may be directly selectable from call initiation panel 402. An exemplary call initiation panel having selectable contact information items rather than a numeric dialing keypad will be described in more detail below.

User input panel 410 may also include one or more communication session initiation components (e.g., call initiation buttons) to initiate a communication session with a phone number that has been dialed or otherwise staged using call initiation panel 402. For example, voice call initiation button 404 may be used to initiate a voice call with a phone number that has been dialed. Similarly, video call initiation button 406 may be used to initiate a video call with a phone number that has been dialed. As will be described in more detail below, communication session initiation components such as voice call initiation button 404 and video call initiation button 406 may also be used with other types of call initiation panels such as call initiation panels using selectable contact information items representative of phone numbers of a selected contact. Alternatively, selection of one of selectable items 306 (see FIG. 3) or of a selectable contact information item representative of a phone number of a selected contact may cause a phone call to be initiated directly without a communication session initiation component (e.g., voice call initiation button 404 and/or video call initiation button 406) being selected.

Figure 5:
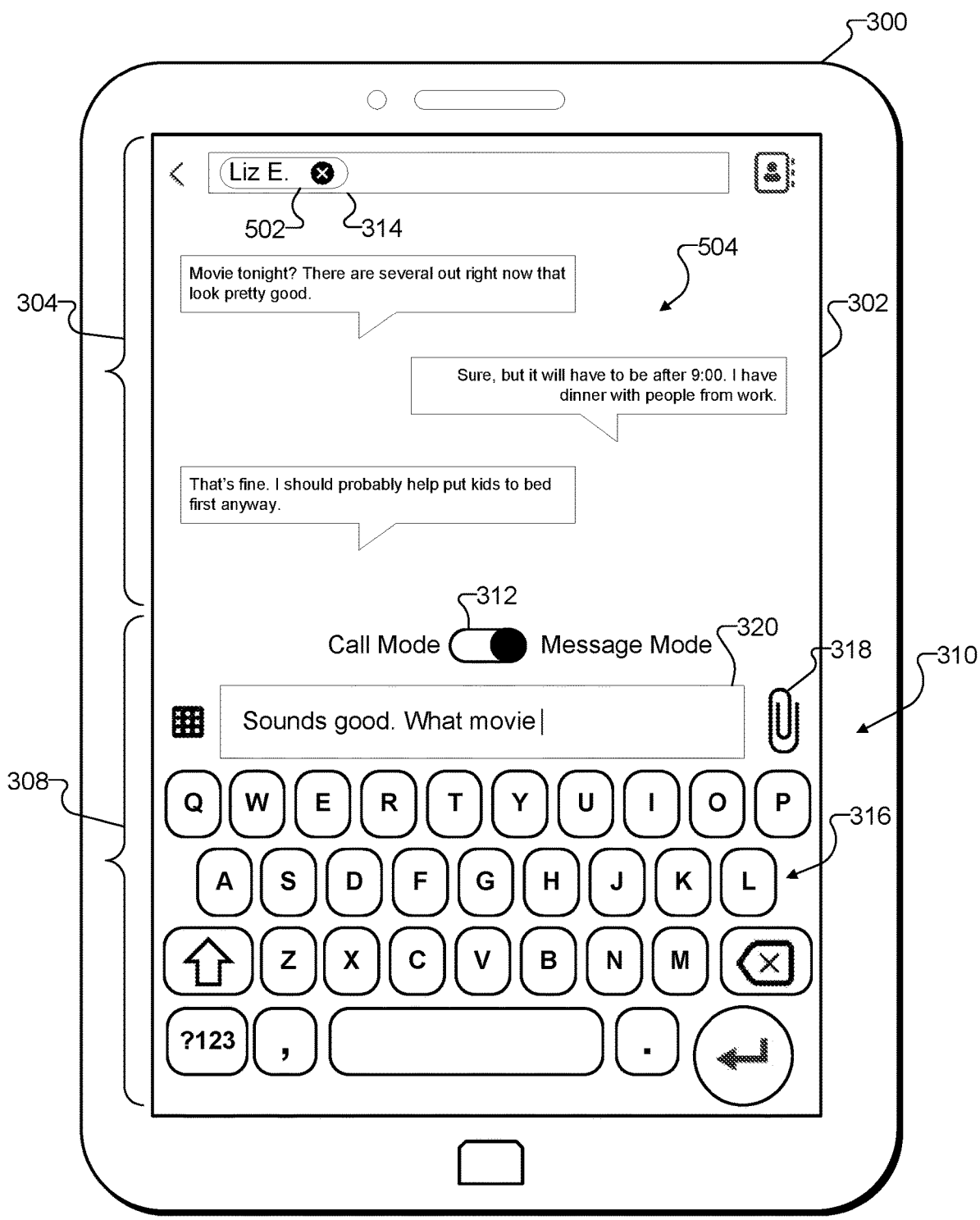

FIG. 5 shows exemplary communication device 300 on which exemplary on-screen user interface 302 is presented. Within user interface 302, FIG. 5 shows several of the elements described above with respect to FIG. 3. For example, FIG. 5 shows contact communication pane 304 with contact selection field 314 to facilitate users in searching and selecting a desired contact. FIG. 5 also includes communication initiation pane 308 with user input panel 310 for allowing the user to initiate a communication session and graphical user input component 312 for allowing the user to select the communication mode of the communication session. In accordance with input component 312 being set to "Message Mode," user input panel 310 includes alphabetic typing keypad 316, attachment selection icon 318, and message editing stage 320. These elements may each perform the same or similar functions in the example of FIG. 5 as discussed above in relation to FIG. 3.

However, whereas FIG. 3 displays selectable items 306 representing contacts of the user for the user to select from, contact communication pane 304 shows a selected contact 502 (e.g., a contact named "Liz E." that was selected using selectable items 306 in FIG. 3) within contact selection field 314 and a communication history 504 between the user of communication device 300 and selected contact 502 within contact communication pane 304. Specifically, communication history 504 illustrates a messaging exchange with several text messages between the user and selected contact 502 (i.e. Liz E.).

As explained above, a plurality of contacts may be selected using selectable items 306 in FIG. 3 in order to initiate a group communication session. Thus, in an example including a plurality of selected contacts, other selected contacts may be displayed within contact selection field 314 along with selected contact 502. Additionally, a communication history including one or more communication history records from all the members of the group may be displayed in place of communication history 504. Thus, while the examples described herein focus on separate communication sessions (i.e. stand-alone communication sessions) for clarity and simplicity of description, it will be understood that the teachings of the present disclosure are equally applicable to group communication sessions as to separate communication sessions.

Because of space limitations of the display screen of communication device 300, user interface 302 may display only a few messages from the messaging exchange between the user and selected contact 502 at once. However, the user may perform a user touch gesture (e.g., swiping up and/or down) with respect to contact communication pane 304 to scroll through additional messages and/or other communication session records (e.g., records of phone calls, etc.) stored in communication history 504. For example, all of the communication history between the user and selected contact 502 may be stored (e.g., within communication session data 106 of storage facility 104, described above in relation to FIG. 1) and may be viewable as part of communication history 504. Alternatively, a partial communication history between the user and selected contact 502 such as the communication history within a certain time frame (e.g., within the last week, month, etc.) may be stored and viewable as part of communication history 504.

Each record (e.g., message, phone call, etc.) within communication history 504 may include various information related to a communication session with which the record is associated. For example, a record may include the data included in a message (e.g., the text of the message, the multimedia content of the message, a file attached to the message, etc.). Similarly, a record may include information about the source of the communication session (e.g., who initiated the phone call or messaging exchange), the source of a particular message within a messaging exchange, a group list for the one or more persons participating in the communication session, a recipient list including the one or more recipients to whom a particular message was sent, a timestamp corresponding to when the communication session was initiated, a timestamp corresponding to when a particular message was sent, a timestamp corresponding to when the communication session was terminated, a timestamp corresponding to when a particular message was received, etc. Since all of the records within communication history 504 may not be able to be presented at once within user interface 302, the most recent communications may be displayed within user interface 302 by default.

For example, as shown in communication history 504, the three most recent messages in a messaging exchange communication session between the user of communication device 300 and selected contact 502 (i.e., Liz E.) are displayed within contact communication pane 304 in user interface 302 in response to a determination that the user selected the selectable item 306 corresponding to Liz E. (see FIG. 3). Specifically, communication history 504 shows that selected contact 502 previously sent a text message to the user asking:

"Movie tonight? There are several out right now that look pretty good."

Communication history 504 further shows that the user responded with a message back to selected contact 502:

"Sure, but it will have to be after 9:00. I have dinner with people from work."

Finally, communication history 504 shows that selected contact 502 replied back to the user:

"That's fine. I should probably help put kids to bed first anyway."

As shown in message editing stage 320, the user may currently be using alphabetic typing keypad 316 within user input panel 310 in communication initiation pane 308 to input and stage a reply:

"Sounds good. What movie . . . "

Communication history 504 may contain any suitable information as may serve a particular implementation. Thus, in certain implementations, communication history 504 may include communication history information related to only one communication mode. For example, as illustrated in FIG. 5, communication history 504 may include only communication session records from messaging exchanges (e.g., text message records, multimedia content records, file attachment records, etc.). In other examples, communication history 504 may include only communication session records from phone calls (e.g., voice call records, video call records, etc.). In yet other examples, communication history 504 may include only a certain type of communication session within a particular communication mode (e.g., text message records but not multimedia message records, voice call records but not video call records, etc.). In other implementations, communication history 504 may include communication history information related to multiple communication modes. For example, as will be described in more detail below with respect to FIG. 8, communication history 504 may include communication session records from messaging exchanges and communication session records from phone calls, as well as communication session records related to other communication modes and/or any other information as may serve a particular implementation.

A user action with respect to communication initiation pane 308 (e.g., manipulation by the user of input component 312, a user input gesture, etc.) may be detected while communication history 504 is displayed within contact communication pane 304. In response to the user action, user input panel 310 (described above with respect to FIG. 3) may be graphically replaced with user input panel 410 (described above with respect to FIG. 4). More particularly, a user input panel (e.g., user input panel 310) configured with an alphabetic typing keypad, an attachment selection icon, a message editing stage, and/or other components to allow the user to initiate a messaging exchange may be replaced with a user input panel (e.g., user input panel 410) configured with a call initiation panel, a voice call initiation button, a video call initiation button, and/or other components to allow the user to initiate a phone call. Similarly, a user input panel (e.g., user input panel 410) configured with a call initiation panel, a voice call initiation button, a voice call initiation button, and/or other components to allow the user to initiate a phone call may be replaced with a user input panel (e.g., user input panel 310) configured with an alphabetic typing keypad, an attachment selection icon, a message editing stage, and/or other components to allow the user to initiate a messaging exchange.

Figure 6:
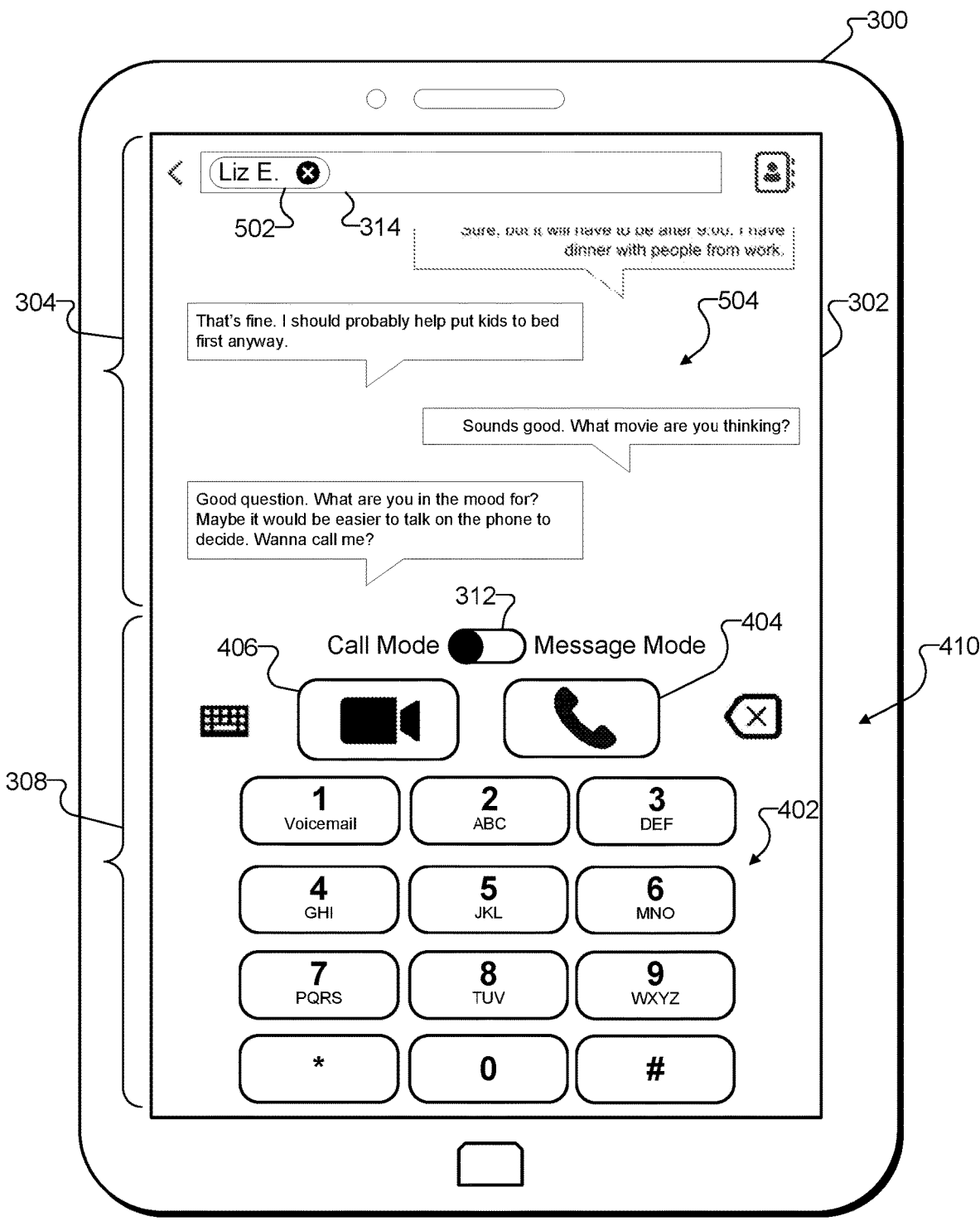

To illustrate, FIGS. 5 and 6 both show exemplary communication device 300 on which exemplary on-screen user interface 302 is presented. Beginning with FIG. 5, a user action may be performed with respect to input component 312 shown within user interface 302 in FIG. 5. Specifically, input component 312 may be manipulated by the user (e.g., by sliding the slider switch of input component 312) to modify communication initiation pane 308 from "Message Mode" to "Call Mode." As a result, user input panel 310 (illustrated in FIG. 5 to be configured with alphabetic typing keypad 316, attachment selection icon 318, and message editing stage 320 to allow the user to initiate a messaging exchange) may be replaced with user input panel 410 (illustrated in FIG. 6 to be configured with call initiation panel 402, voice call initiation button 404, and video call initiation button 406 to allow the user to initiate a phone call).

Conversely, beginning with FIG. 6, a user action may be performed with respect to input component 312 shown within user interface 302 in FIG. 6. Specifically, input component 312 may be manipulated by the user (e.g., by sliding the slider switch of input component 312) to modify communication initiation pane 308 from "Call Mode" to "Message Mode." As a result, user input panel 410 (illustrated in FIG. 6 to be configured with call initiation panel 402, voice call initiation button 404, and video call initiation button 406 to allow the user to initiate a phone call) may be replaced with user input panel 310 (illustrated in FIG. 5 to be configured with alphabetic typing keypad 316, attachment selection icon 318, and message editing stage 320 to allow the user to initiate a messaging exchange).

In certain examples, a first communication initiation action performed by the user with respect to a first user input panel (e.g., user input panel 310 or user input panel 410) may be detected. In response, a first communication session of the communication mode associated with the first user input panel may be initiated between the user and a selected contact. Subsequently, a user action with respect to the communication initiation pane (e.g., manipulation of a graphical user input component, a user input gesture, etc.) may be detected and, consequently, the first user input panel may be graphically replaced by a second user input panel as described above. Subsequent to the graphical replacement of the first user input panel with the second user input panel, a second communication initiation action performed by the user with respect to the second user input panel may be detected. In response, a second communication session of the communication mode associated with the second user input panel may be initiated between the user and a selected contact.

To illustrate, the first user input panel may be user input panel 310, as illustrated in FIG. 5, and the first communication initiation action detected may be the typing and exchanging of a message, such as the message illustrated within message editing stage 320 in FIG. 5:

"Sounds good. What movie are you thinking?"

Thus, a messaging exchange communication session may be initiated between the user and Liz E., who is selected contact 502. In FIG. 6, communication history 504 illustrates that this particular message was exchanged with Liz E., and that Liz E. exchanged an additional message with the user of communication device 300 in response:

"Good question. What are you in the mood for? Maybe it would be easier to talk on the phone to decide. Wanna call me?"

Upon receiving this message, the user may decide that the messaging exchange is no longer the most effective or desirable communication mode for the communication session with Liz E. Instead, as suggested by the most recent message sent by Liz E., the user may decide to initiate a phone call with Liz E. to continue the conversation that started in the messaging exchange. Accordingly, as described above, the user may perform a user action such as manipulating input component 312 or performing a predetermined user input gesture to modify communication initiation pane 308 from "Message Mode" to "Call Mode." As a result, user input panel 310 of FIG. 5 may be graphically replaced within communication initiation pane 308 by user input panel 410 of FIG. 6 to allow the user to initiate a phone call.

Subsequently, the second communication initiation action performed by the user may be selecting a phone number and initiating a phone call with Liz E. For example, call initiation panel 402 shown within user input panel 410 in FIG. 6 may allow the user to dial a particular phone number (e.g., a phone number associated with Liz E.) and to initiate a voice call or a video call with that phone number by selecting voice call initiation button 404 or video call initiation button 406, respectively.

Figure 7:
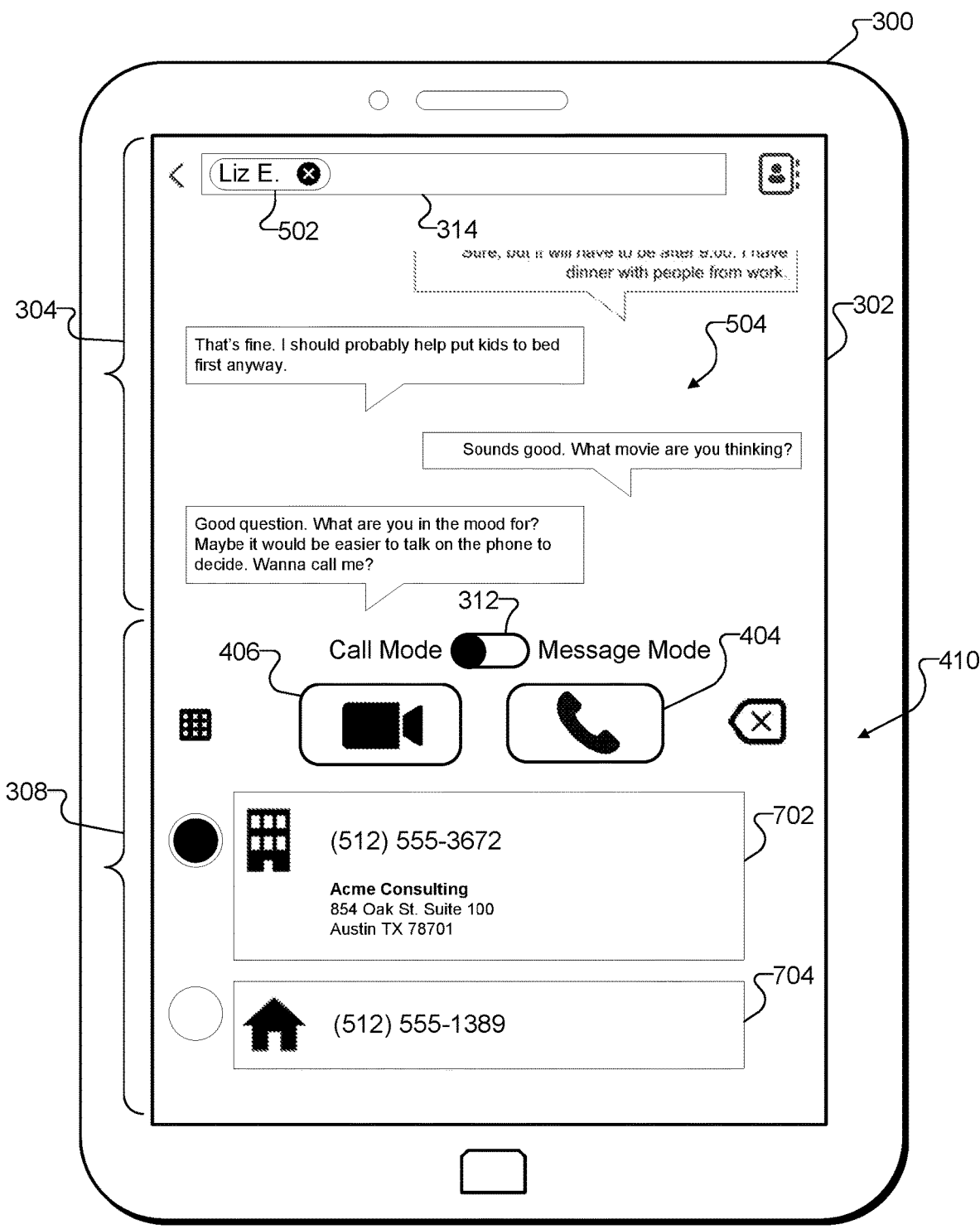

As another example, FIG. 7 shows exemplary communication device 300 on which exemplary on-screen user interface 302 is presented. In FIG. 7, a first selectable contact information item 702 and a second selectable contact information item 704 each shows a contact information record associated with selected contact 502 (i.e. Liz E.). Selectable contact information items 702 and 704 may allow the user to select a particular phone number associated with selected contact 502 to allow the user to directly initiate a phone call with selected contact 502 without dialing the phone number. For example, as shown, item 702 may include an icon of an office building indicating that the phone number contained within item 702 is associated with a workplace of selected contact 502. As shown, item 702 may also include a name of the company that selected contact 502 works at, and a street address where selected contact 502 works. Additionally, item 702 may include any other suitable information associated with selected contact 502 and stored (e.g., within contact data 108 in storage facility 104, described above in relation to FIG. 1) for selected contact 502 such as one or more email addresses, fax numbers, webpage URLs, birthdates, other relevant dates (e.g., anniversaries, etc.), related names, social networking profiles, instant messages, etc. (not shown). In other examples, only a phone number may be stored for selected contact 502 and/or item 702 may only show a phone number when displayed within user input panel 410. For example, item 704 includes a second phone number associated with selected contact 502. Item 704 displays an icon of a house, indicating that the phone number may be a home phone number of selected contact 502.

The user of communication device 300 may select either item 702 or 704 or may perform user gestures to scroll within user input panel 410 to display additional selectable contact information items with additional phone numbers that may be available for selected contact 502 (e.g., a mobile phone number, not shown). After a desired selectable contact information item has been selected, the user may select voice call initiation button 404 or video call initiation button 406 to initiate the phone call, as described above in relation to when user input panel 410 includes call initiation panel 402. In response to the user selecting one of buttons 404 and 406, the phone call between the user and Liz E may be initiated.

In certain examples, one or more of the above actions may be performed (e.g., by system 100) while the first communication session (i.e. the messaging exchange between the user and selected contact 502) is ongoing. For example, the detecting of the user action, graphical replacement of the first user input panel with the second user input panel, and the detecting of the second communication initiation action may be performed while the first communication session is ongoing. In other words, as described above, system 100 may detect a manipulation of input component 312, graphically replace user input panel 310 with user input panel 410, and detect the initiation of the phone call to selected contact 502 (i.e. Liz E) all while the messaging exchange between the user and Liz E. is ongoing.

Similarly, in other examples, communication initiation pane 308 may begin in "Call Mode" and the user may first perform a communication initiation action using user input panel 410 (as illustrated in FIG. 6) to initiate a phone call. Subsequently, after the phone call has terminated or while the phone call is ongoing, a user action performed in relation to communication initiation pane 308 (e.g., manipulating input component 312) may cause communication initiation pane 308 to switch from "Call Mode" to "Message Mode" and, in response, user input panel 410 may be graphically replaced by user input panel 310 (as illustrated in FIG. 5). The user may then prepare a message using user input panel 310 and initiate a messaging exchange communication session to exchange the message with a selected contact.

Figure 8:
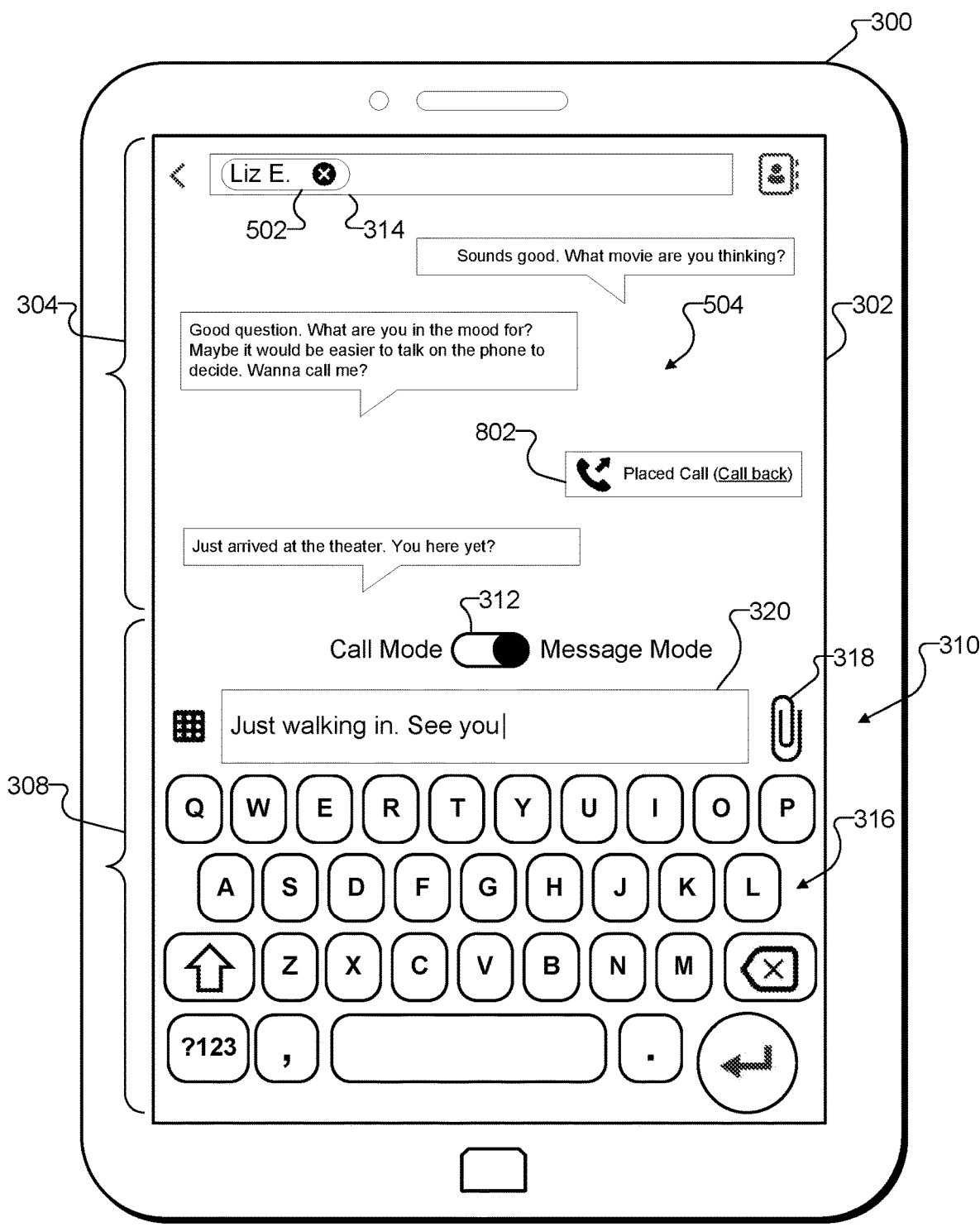

For example, FIG. 8 shows exemplary communication device 300 on which exemplary on-screen user interface 302 is presented. More specifically, FIG. 8 shows communication history 504, discussed in relation to various examples above, at a subsequent point in time. As shown, communication history 504 displayed within contact communication pane 304 includes communication history information related to both a messaging exchange communication mode (e.g., text messages) and to a phone call communication mode (e.g., a placed call). More specifically, record 802 illustrates that the user of communication device 300 placed a call to selected contact 502 (i.e. Liz E.) after being invited to do so by the proceeding text message exchange from Liz E., as discussed above in relation to FIGS. 6 and 7. Accordingly, the user and Liz E. may have determined which movie to see during the phone call and later, as they are arriving at the theater for the movie, may decide that a messaging exchange communication mode is again the most convenient and/or effective communication mode. Thus, as shown, Liz E. exchanges a text message stating:

"Just arrived at the theater. You here yet?"

As shown, the user of communication device 300 has manipulated input component 312 to switch communication initiation pane 308 back to "Message Mode" to bring up user input panel 310 with alphabetic typing keypad 316, attachment selection icon 318, and message editing stage 320 to allow the user to exchange a message (i.e. "Just walking in. See you in a minute.") in response to the previous message exchanged by Liz E. While, in this particular example, communication initiation pane 308 was switched back to "Message Mode" after a phone call (e.g., the phone call represented by record 802) had been terminated, it will be understood that in other examples the user may manipulate input component 312 to switch communication initiation pane 308 back to "Message Mode" and initiate a messaging exchange using user input panel 310 while the phone call is still ongoing. Regardless, while communication initiation pane 308 switches back and forth between "Call Mode" and "Message Mode," contact communication pane 304 may not be substantially affected. For example, as illustrated in the examples of FIGS. 5-8, contact communication pane 304 may continue displaying communication history 504 even while communication initiation pane 308 is switched between "Call Mode" and "Message Mode" and used to initiate communication sessions of different communication modes.

Figure 9:
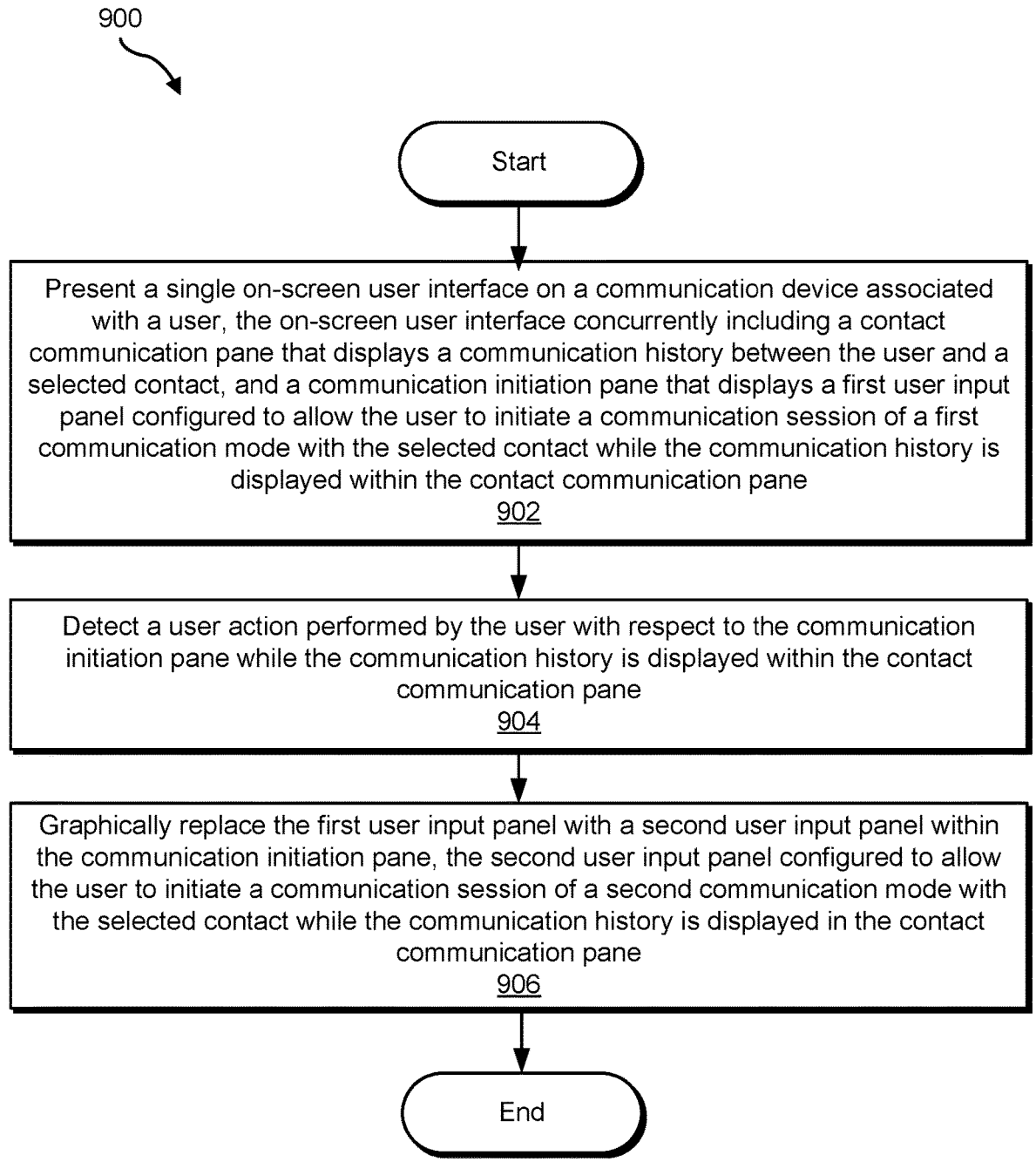
FIGS. 9-10 illustrate exemplary methods for managing multiple modes of communication within a single on-screen user interface according to principles described herein.

FIG. 9 illustrates an exemplary method 900 of managing multiple modes of communication within a single on-screen user interface. While FIG. 9 illustrates exemplary operations according to one embodiment, other embodiments may omit, add to, reorder, and/or modify any of the operations shown in FIG. 9. One or more of the operations shown in FIG. 9 may be performed by system 100 and/or any implementation thereof.

In operation 902, a multimode communication system presents a single on-screen user interface on a communication device associated with a user, the on-screen user interface concurrently including a contact communication pane that displays a communication history between the user and a selected contact, and a communication initiation pane that displays a first user input panel configured to allow the user to initiate a communication session of a first communication mode with the selected contact while the communication history is displayed within the contact communication pane. Operation 902 may be performed in any of the ways described herein.

In operation 904, the multimode communication system detects a user action performed by the user with respect to the communication initiation pane while the communication history is displayed within the contact communication pane. Operation 904 may be performed in any of the ways described herein.

In operation 906, the multimode communication system graphically replaces the first user input panel with a second user input panel within the communication initiation pane, the second user input panel configured to allow the user to initiate a communication session of a second communication mode with the selected contact while the communication history is displayed in the contact communication pane. For example, the multimode communication system may graphically replace the first user input panel with the second user input panel in response to detecting the user action in operation 904. Operation 906 may be performed in any of the ways described herein.

Figure 10:
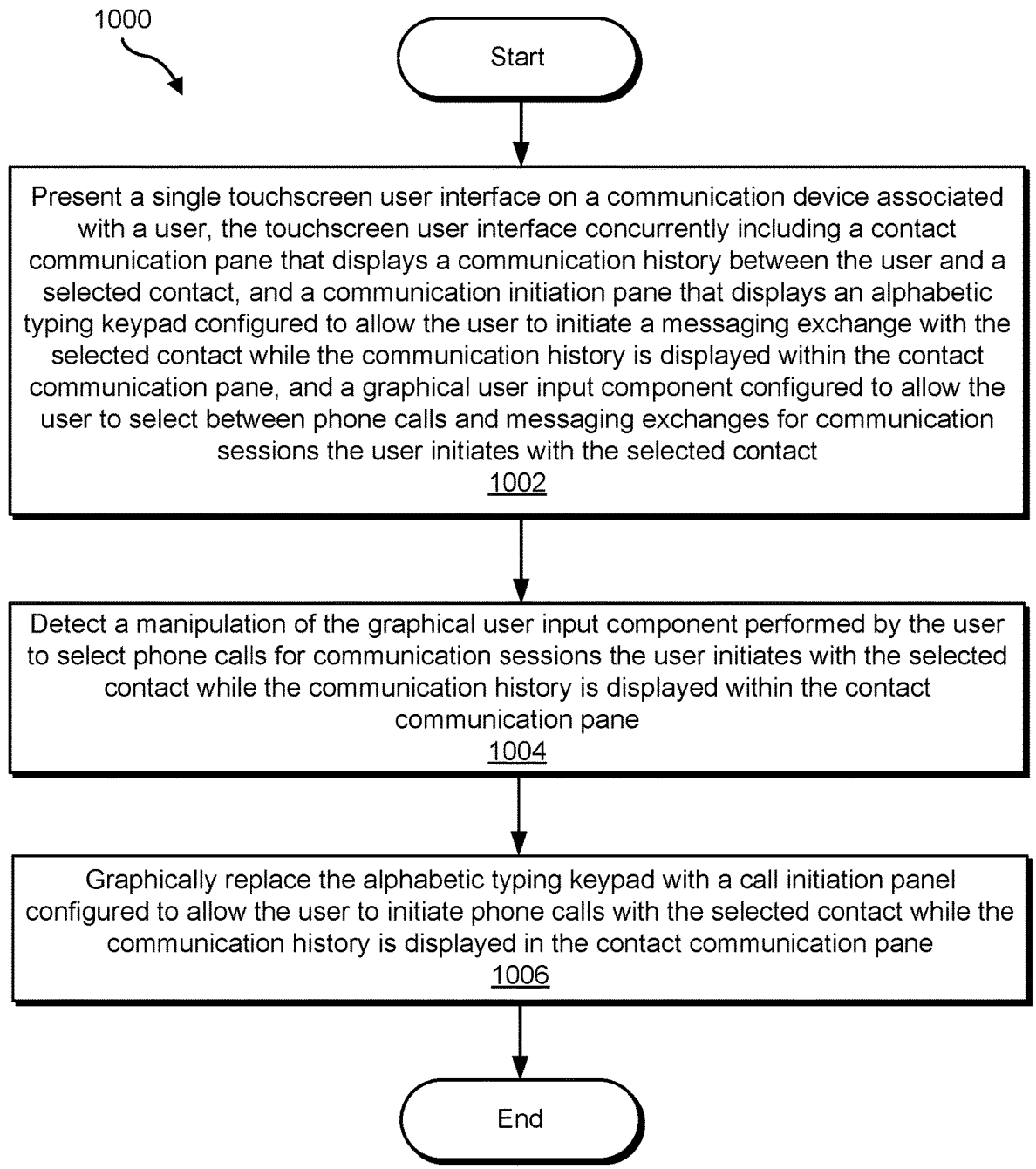

FIG. 10 illustrates an exemplary method 1000 of managing multiple modes of communication within a single on-screen user interface. While FIG. 10 illustrates exemplary operations according to one embodiment, other embodiments may omit, add to, reorder, and/or modify any of the operations shown in FIG. 10. One or more of the operations in FIG. 10 may be performed by system 100 and/or any implementation thereof.

In operation 1002, a multimode communication system presents a single touchscreen user interface on a communication device associated with a user, the touchscreen user interface concurrently including a contact communication pane that displays a communication history between the user and a selected contact, and a communication initiation pane that displays an alphabetic typing keypad configured to allow the user to initiate a messaging exchange with the selected contact while the communication history is displayed within the contact communication pane, and a graphical user input component configured to allow the user to select between phone calls and messaging exchanges for communication sessions the user initiates with the selected contact. Operation 1002 may be performed in any of the ways described herein.

In operation 1004, the multimode communication system detects a manipulation of the graphical user input component performed by the user to select phone calls for communication sessions the user initiates with the selected contact while the communication history is displayed within the contact communication pane. Operation 1004 may be performed in any of the ways described herein.

In operation 1006, the multimode communication system graphically replaces the alphabetic typing keypad with a call initiation panel configured to allow the user to initiate phone calls with the selected contact while the communication history is displayed in the contact communication pane. For example, the multimode communication system may graphically replace the alphabetic typing keypad with the call initiation panel in response to detecting the manipulation of the graphical user input component to select phone calls in operation 1004. Operation 1006 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
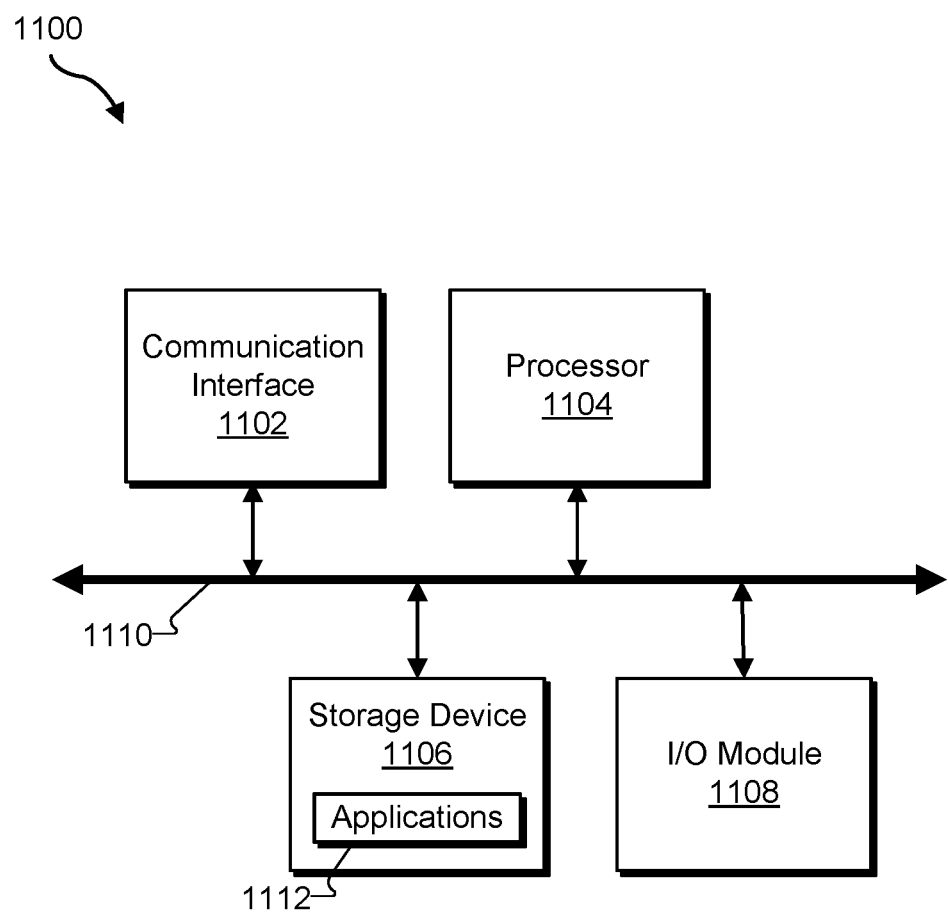
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with management facility 102. Likewise, storage facility 104 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    presenting, by a multimode communication system, a single on-screen user interface on a communication device associated with a user, the on-screen user interface concurrently including:
        a contact communication pane that displays a communication history between the user and a selected contact, and
        a communication initiation pane that displays an alphabetic typing keypad configured to allow the user to initiate a messaging exchange with the selected contact while the communication history is displayed within the contact communication pane;
    detecting, by the multimode communication system while the communication history is displayed within the contact communication pane, a user action performed, by the user and with respect to an input component, to toggle the communication initiation pane from a message mode to a call mode, the input component configured to
        indicate to the user whether the communication initiation pane is in the call mode or the message mode, and
        allow the user to perform the user action to toggle the communication initiation pane from one of the call and message modes to the other of the call and message modes; and
    graphically replacing, by the multimode communication system in response to the user action and as the communication history continues to be displayed within the contact communication pane, the alphabetic typing keypad with a call initiation panel within the communication initiation pane, the call initiation panel featuring a call initiation button that is configured to allow the user to initiate a phone call, that is distinct from the input component, and that is presented only with the call initiation panel and not with the alphabetic typing keypad graphically replaced by the call initiation panel.

2. The method of claim 1, further comprising:
    presenting, by the multimode communication system within the contact communication pane, a plurality of selectable items, each selectable item representative of a contact of the user;
    detecting, by the multimode communication system, that the user selects a first item from the plurality of selectable items; and
    determining, by the multimode communication system, that the first item is representative of the selected contact;
    wherein the communication history between the user and the selected contact is displayed within the contact communication pane in response to the determining that the first item is representative of the selected contact.

3. The method of claim 2, further comprising:
    detecting, by the multimode communication system, that the user selects a second item from the plurality of selectable items; and
    determining, by the multimode communication system, that the second item is representative of a second selected contact;
    wherein the alphabetic typing keypad is configured to allow the user to initiate a group messaging exchange with the selected contact and the second selected contact while the communication history is displayed within the contact communication pane; and
    wherein the call initiation panel is configured to allow the user to initiate a group call with the selected contact and the second selected contact while the communication history is displayed in the contact communication pane.

4. The method of claim 1, wherein:
    the input component is not a graphical user input component;
    the on-screen user interface is a touchscreen user interface; and
    the input component is implemented so as to be configurable by a user touch gesture performed by the user with respect to the communication initiation pane on the touchscreen user interface.

5. The method of claim 1, wherein:
    the call initiation panel includes a numeric dialing keypad to allow the user to dial a phone number of the selected contact; and
    the alphabetic typing keypad includes a QWERTY keypad.

6. The method of claim 1, further comprising:
    detecting, by the multimode communication system in response to the presenting of the communication initiation pane that displays the alphabetic typing keypad, a first communication initiation action performed by the user with respect to the alphabetic typing keypad;
    initiating, by the multimode communication system in response to the first communication initiation action, the messaging exchange between the user and the selected contact;
    detecting, by the multimode communication system subsequent to the graphically replacing of the alphabetic typing keypad with the call initiation panel, a second communication initiation action performed by the user with respect to the call initiation panel; and initiating, by the multimode communication system in response to the second communication initiation action, the phone call between the user and the selected contact.

7. The method of claim 6, wherein the detecting of the user action, the graphical replacement of the alphabetic typing keypad with the call initiation panel, and the detecting of the second communication initiation action are performed while the messaging exchange between the user and the selected contact is ongoing.

8. The method of claim 1, wherein:
the input component is a graphical user input component configured to allow the user to select either the message mode or the call mode for communication sessions the user initiates with the selected contact; and
the user action includes a manipulation by the user of the graphical user input component.

9. The method of claim 1, wherein the communication history displayed within the contact communication pane includes communication history information related to both the messaging exchange with the selected contact and the phone call with the selected contact.

10. The method of claim 1, embodied as computer-executable instructions on at least one non-transitory computer-readable medium.

11. The method of claim 1, wherein:
the call initiation panel includes a selectable contact information item representative of the phone number of the selected contact to allow the user to directly initiate the phone call with the selected contact without dialing the phone number of the selected contact; and
the alphabetic typing keypad includes a QWERTY keypad.

12. The method of claim 1, further comprising:
detecting, by the multimode communication system subsequent to the graphically replacing of the alphabetic typing keypad with the call initiation panel within the communication initiation pane, an additional user action performed by the user with respect to the communication initiation pane; and
graphically replacing, by the multimode communication system in response to the additional user action, the call initiation panel with the alphabetic typing keypad within the communication initiation pane.

13. A method comprising:
presenting, by a multimode communication system, a single touchscreen user interface on a communication device associated with a user, the touchscreen user interface concurrently including:
a contact communication pane that displays a communication history between the user and a selected contact, and
a communication initiation pane that displays:
an alphabetic typing keypad configured to allow the user to initiate a messaging exchange with the selected contact while the communication history is displayed within the contact communication pane, and
a graphical user input component configured to indicate to the user whether the communication initiation pane is in a call mode or a message mode and to allow the user to perform a manipulation of the graphical user input component to toggle the communication initiation pane from one of the call and message modes to the other of the call and message modes;

detecting, by the multimode communication system while the communication history is displayed within the contact communication pane, the manipulation of the graphical user input component performed by the user to toggle the communication initiation pane from the message mode to the call mode; and
graphically replacing, by the multimode communication system in response to the manipulation of the graphical user input component and as the communication history continues to be displayed within the contact communication page, the alphabetic typing keypad with a call initiation panel within the communication initiation pane, the call initiation panel featuring a call initiation button that is configured to allow the user to initiate a phone call, that is distinct from the input component, and that is presented only with the call initiation panel and not with the alphabetic typing keypad graphically replaced by the call initiation panel.

14. The method of claim 13, embodied as computer-executable instructions on at least one non-transitory computer-readable medium.

15. A system comprising:
at least one physical computing device that:
presents a single on-screen user interface on a communication device associated with a user, the on-screen user interface concurrently including:
a contact communication pane that displays a communication history between the user and a selected contact, and
a communication initiation pane that displays an alphabetic typing keypad configured to allow the user to initiate a messaging exchange with the selected contact while the communication history is displayed within the contact communication pane;
detects, while the communication history is displayed within the contact communication pane, a user action performed, by the user and with respect to an input component, to toggle the communication initiation pane from a message mode to a call mode, the input component configured to
indicate to the user whether the communication initiation pane is in the call mode or the message mode, and
allow the user to perform the user action to toggle the communication initiation pane from one of the call and message modes to the other of the call and message modes; and
graphically replaces, as the communication history continues to be displayed within the contact communication pane, the alphabetic typing keypad with a call initiation panel within the communication initiation pane, the call initiation panel featuring a call initiation button that is configured to allow the user to initiate a phone call, that is distinct from the input component, and that is presented only with the call initiation panel and not with the alphabetic typing keypad graphically replaced by the call initiation panel.

16. The system of claim 15, wherein the at least one physical computing device further:
presents within the contact communication pane a plurality of selectable items, each selectable item representative of a contact of the user;
detects that the user selects a first item from the plurality of selectable items; and determines that the first item is representative of the selected contact;

wherein the communication history between the user and the selected contact is displayed within the contact communication pane in response to the determining that the first item is representative of the selected contact.

17. The system of claim 15, wherein the call initiation panel includes at least one of a numeric dialing keypad to allow the user to dial a phone number of the selected contact and a selectable contact information item representative of the phone number of the selected contact to allow the user to directly initiate the phone call with the selected contact without dialing the phone number.

18. The system of claim 15, wherein the at least one physical computing device further:
  - detects a first communication initiation action performed by the user with respect to the alphabetic typing keypad in response to the presenting of the communication initiation pane that displays the alphabetic typing keypad;
  - initiates the messaging exchange between the user and the selected contact in response to the first communication initiation action;
  - detects a second communication initiation action performed by the user with respect to the call initiation panel subsequent to the graphically replacing of the alphabetic typing keypad with the call initiation panel; and
  - initiates the phone call between the user and the selected contact in response to the second communication initiation action.

19. The system of claim 15, wherein:
  - the input component is a graphical user input component configured to allow the user to select either the message mode or the call mode for communication sessions the user initiates with the selected contact; and
  - the user action includes a manipulation by the user of the graphical user input component.

20. The system of claim 15, wherein the at least one physical computing device further:
  - detects, subsequent to the graphical replacement of the alphabetic typing keypad with the call initiation panel within the communication initiation pane, an additional user action performed by the user with respect to the communication initiation pane; and
  - graphically replaces, in response to the additional user action, the call initiation panel with the alphabetic typing keypad within the communication initiation pane.

* * * * *